No. 726,181. PATENTED APR. 21, 1903.
W. L. MOORE.
PROCESS OF COOLING, DRYING, AND PURIFYING AIR.
APPLICATION FILED JUNE 26, 1902.
NO MODEL.
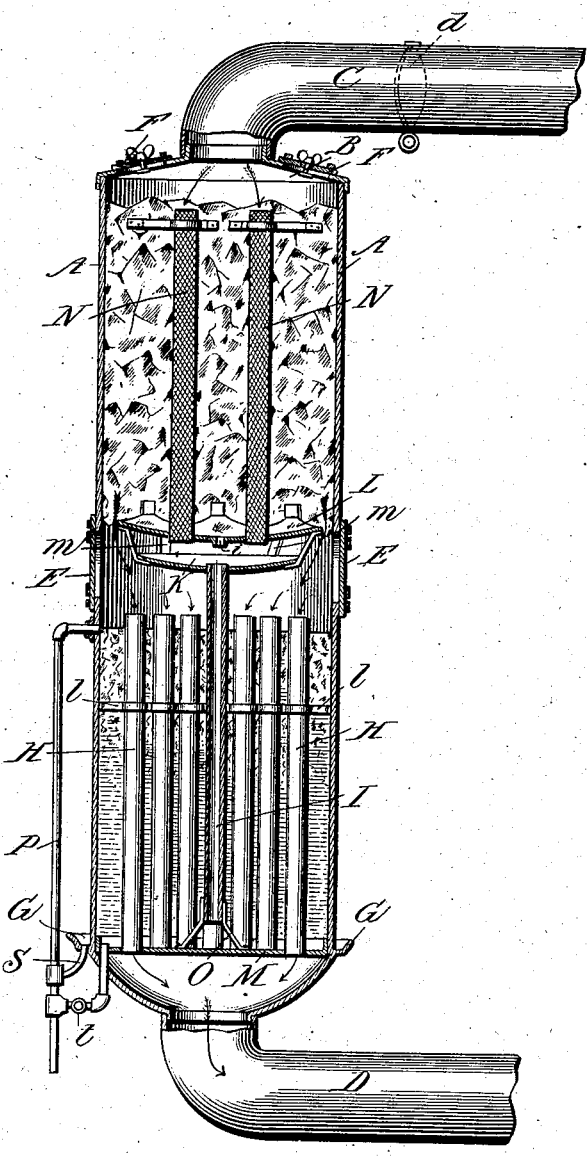
WITNESSES:
Geo P. Kingsbury
Edw. W. Byrn.
INVENTOR
Willis L. Moore
BY Munn & Co
ATTORNEYS.

UNITED STATES PATENT OFFICE.

WILLIS LUTHER MOORE, OF WASHINGTON, DISTRICT OF COLUMBIA.

PROCESS OF COOLING, DRYING, AND PURIFYING AIR.

SPECIFICATION forming part of Letters Patent No. 726,181, dated April 21, 1903.

Application filed June 26, 1902. Serial No. 113,331. (No specimens.)

*To all whom it may concern:*

Be it known that I, WILLIS LUTHER MOORE, a citizen of the United States, residing in Washington city, in the District of Columbia, have invented a certain new and useful Process for Cooling, Drying, and Purifying Air; and I do hereby declare that the following is a full, clear, and exact description of the invention, which will enable others to use the same, reference being had to the accompanying drawing, and to the letters of reference marked thereon, which forms a part of this specification.

The object of my invention is to provide a process for cooling, drying, and purifying the air in dwelling-houses, railway-coaches, hospitals, theaters, hotels, apartment-houses, and other places and for the keeping of meats, produce, or anything that requires a low temperature, which shall partly or wholly take in air from the outside of a building, bring the air in contact with melting ice for the purpose of lowering its temperature, and by the surface attraction or tension of the water on the exterior of the melting ice extract the dust from the air and by reducing the temperature of the air much below its initial temperature (probably nearly to that of melting ice) precipitate the greater part of its moisture, and thereby render it dry, as well as cool and pure, then to pass the air through metal pipes, which are surrounded by melting ice and chlorid of sodium, chlorid of calcium, or other chemical or mixtures to lower the melting-point of ice, and then as the air passes down through these pipes cause it to lose more of its heat, and finally by gravity to be discharged from the bottom of the apparatus into the lower part of the room to be cooled—that is to say, my process comprehends the steps of progressively cooling air by subjecting it first to the temperature of melting ice and then to the lower temperature of a freezing mixture, whereby the fall of the air by gravity is so energized as to stimulate its active movement without forcing apparatus, the air being progressively cooled and dried and made to flow with the accelerated movement due to such progressive cooling.

The figure is a vertical central section of an apparatus for carrying out my process.

In the drawing, A indicates the outer shell or casing of the cooling apparatus, which may be either cylindrical or rectangular. It is preferred to make this shell of some metal that freely conducts heat, like copper, because the apparatus usually will be placed in the room or apartment to be cooled, and the warm humid air of the room coming in contact with the cold surface of the shell will precipitate moisture on the outside, which moisture will be collected at the bottom by trough G and discharged through pipe S into the waste and overflow pipe P. All of the interior of the shell or cylinder A except that occupied by apparatus and the space between the tops of pipes H and the bottom of drip-pan K may be filled with cooling media, the upper part being filled with ice and the lower part with ice mixed with chlorid of sodium or ice mixed with chlorid of calcium or other freezing mixtures.

B is a top to fit upon the cylinder A.

F F are doors in the top of the cylinder to admit ice to the upper half of the cylinder A.

E E are doors in the sides of the cylinder A, through which ice and salt are admitted to the lower half of said cylinder.

N N are tubes or cylinders of woven wire or perforated or reticulated material to facilitate the flow of air through the broken ice and the diffusion of the air laterally through the ice.

The tendency of broken or granulated ice is when melting to cake together and cohere in a solid mass, which eliminates interstitial spaces and precludes the proper diffusion of air through the mass and also retards and eventually wholly obstructs its circulation and flow, especially when its downward movement by gravity alone is relied upon, as in my process. These reticulated tubes or cylinders always maintain passage-ways for the air through the ice, and as the ice melts the woven-wire mesh becomes embedded in the ice, as in a matrix, and thus both holds the ice up against gravitating into a cake at the bottom and also allows lateral diffusion of air through the tubes into the interstices of the ice, thus maintaining the flow of air and greatly increasing the cooling effect.

L shows the intermediate bottom with scalloped edges fastened to the sides of the cylinder A. It has a central outlet at $i$, where the water escapes through the intermediate bottom into the subjacent drip-pan K. I is a pipe connected to the center of this drip-pan, through which pipe the drip-water from the ice above is conducted and is discharged near the bottom of the cylinder A, the object being to keep the greatest degree of cold near the bottom of the cylinder, so that as the air falls by gravity it shall continually encounter regions having a lower temperature than its own, and thereby continue to lose heat until it leaves the bottom of the cylinder and enters the room.

H H are thin copper pipes that receive the air after it passes the intermediate bottom. These pipes are open at both top and bottom and are surrounded with broken ice and some salt that lowers the melting-point of ice. I do not limit myself to the use of ice alone in the upper part of the shell, as some salt may be mixed with the ice, in which case the drip would be in the form of brine.

By breaking the ice in the lower compartment finer and combining with it a considerable quantity of chlorid of sodium or chlorid of calcium or other chemical that lowers the melting-point of ice I maintain a lower temperature in the lower half of the shell A than in the upper half, so that the air, which in its passage through the upper half of the shell has been somewhat cooled and very considerably dried, may now by passing into the pipes H be still further cooled and dried.

It is an important matter that the air be first brought into contact with the ice, so that it may part with its dust to the film of water surrounding each piece of the melting ice, and so that, in addition to having its temperature somewhat lowered, it may part with so much of its moisture by condensation upon the cold ice that when it reaches the copper pipes H in the lower half of the cylinder the remaining moisture shall not, by the greater degree of cold in the copper pipes H, be condensed or frozen, and thus obstruct the pipes.

M is the bottom of the cylinder A, into which are fitted the lower ends of the pipes H in such manner that the air that enters the tops of the pipes may be discharged through the bottom M and into the large pipe D, which conducts the air to the room or apartment to be cooled.

It will be seen that by means of the overflow-pipe P the water is trapped in the lower compartment, but may be drained away by a pipe at the bottom, having a valve $t$, discharging into the waste-pipe.

The air in passing through the cylinder A has its temperature rapidly lowered, and as a consequence its specific gravity increased. This causes it to fall and to gain in the rapidity of its fall as it cools and descends. Hence the apparatus when charged will by the action of gravity alone take in air from the outside, wash it free of dust, cool and dry it, and discharge it into the room or apartment to be cooled and preferably into the lower portion, so that pure and cool air may accumulate in a lower stratum in the room, and thus reach the persons or things without being contaminated or rendered less effective by the warmer and less pure air near the top of the room or apartment, or, in case it is desired to cool and dry over and over again the air of the room or apartment, a damper $d$ in the inlet-pipe C may be turned, which will shut off the inflow of air from the outside, and when the doors F F are opened the machine will use over and over again the same air from the room or apartment. This may be done when the machine is used for refrigerating purposes in the preservation of meat, vegetables, manufactured or other articles that require extremely low temperatures, or it may be done when on account of the large space to be cooled but little ventilation is desired, or the damper $d$ may be only partly opened, so as to permit a portion of the air to come from the outside and a portion to be taken from the top of the room through a partly-opened door in the top of the shell.

The steps of my process are so arranged for progressive cooling of the air that its constantly-increasing gravity as it descends and its contraction cause it to move actively from convection alone, so that no forcing or suction fan is required.

I do not claim in this application the apparatus shown, as it is made the subject-matter of a separate application for a patent filed by me May 29, 1902, Serial No. 109,497.

Having thus described my invention, what I claim as new, and desire to secure by Letters Patent, is—

The process of cooling, drying and purifying air, which consists in passing it downwardly through and in direct contact with melting ice with a vertical fall, admitting the water of the melting ice to a freezing mixture of ice and some chemical, and then continuing the passage of this partially cooled and dried air through pipes immersed in the freezing mixture with a direct vertical fall substantially as described.

WILLIS LUTHER MOORE.

Witnesses:
EDW. W. BYRD,
SOLON C. KEMON.